United States Patent [19]
Wright

[11] Patent Number: 5,415,296
[45] Date of Patent: May 16, 1995

[54] DISPLAY SYSTEM FOR USE WITH JEWEL TYPE COMPACT DISC PACKAGING CONTAINERS, AND METHOD OF USE

[76] Inventor: Robert K. Wright, 9926 Berry Plz., Omaha, Nebr. 68127

[21] Appl. No.: 90,778

[22] Filed: Jul. 13, 1993

[51] Int. Cl.$^6$ ............................................... A47F 7/00
[52] U.S. Cl. ...................................................... 211/40
[58] Field of Search .................... 211/40, 41; 206/387, 206/309; 312/9.1, 9.9, 9.11

[56] References Cited

U.S. PATENT DOCUMENTS

| | | |
|---|---|---|
| 3,337,059 | 8/1967 | Hoy . |
| 3,938,665 | 2/1976 | Rumble . |
| 3,960,273 | 6/1976 | Weston . |
| 4,232,790 | 11/1980 | Serrano . |
| 4,350,252 | 9/1982 | Hopkins et al. . |
| 4,573,749 | 3/1986 | Massaro . |
| 4,867,306 | 9/1989 | Factor . |
| 4,940,147 | 7/1990 | Hunt . |
| 4,951,826 | 8/1990 | Tompkins . |
| 5,040,687 | 8/1991 | Whittington . |
| 5,048,680 | 9/1991 | Fitzpatrick . |
| 5,052,564 | 4/1991 | Zuzack . |
| 5,080,231 | 1/1992 | Price, Jr. et al. ............. 211/40 X |
| 5,172,817 | 12/1992 | Gross ............................ 211/40 |
| 5,232,089 | 8/1993 | Kim .......................... 211/40 X |

FOREIGN PATENT DOCUMENTS 1475792 2/1967 France .

Primary Examiner—Alvin C. Chin-Shue
Assistant Examiner—Sarah L. Purol
Attorney, Agent, or Firm—James D. Welch

[57] ABSTRACT

A display system storing compact discs and displaying art work on compact disc packaging containers is disclosed. The display system optimally accommodates the geometry of Jewel type compact disc packaging containers, and allows for formation of multiple display systems. Both two and three dimensional multiple displays can be formed by simple interconnection of display systems.

19 Claims, 4 Drawing Sheets

DISPLAY SYSTEM FOR USE WITH JEWEL TYPE COMPACT DISC PACKAGING CONTAINERS, AND METHOD OF USE

TECHNICAL FIELD

The present invention pertains to display systems and more particularly to display systems for use in retaining Jewel type compact disc packaging containers and the like, in a manner which displays art work present on a forward major area surface thereof.

BACKGROUND

Sound enthusiasts can today obtain recordings in media such as vinyl records, tapes and compact disc etc. The sound quality associated with compact disc recordings, however, has served to increase their popularity. As a result enthusiasts often have rather large collections thereof.

As with other sound media, the packaging containers used for storing and protecting compact discs typically provides art work on a major area surface thereof, and many enthusiasts find pleasure not only in listening to the sound recordings on their compact disks, but also in the viewing of said art work.

Continuing, as is the case with vinyl records, compact discs can be damaged if stored stacked one atop another with their major area surfaces oriented horizontally. As a result they are typically stored individually in packaging containers with their major area surfaces oriented vertically, and typically because of space constraints, side by side. As is the case with vinyl records and their associated packaging containers, this often provides that only a relatively small rectangular dimensioned edge of said packaging containers remain visible. Specific compact discs are often difficult to identify by observing only a small rectangular dimensioned edge of such a packaging container.

In answer to the above, inventors have provided display systems which serve to store compact discs therein with the major area, art work containing, surface of their packaging container oriented vertically and aesthetically faced so as to be visible to a user thereof, while said compact discs are being stored.

For example, a Patent to Zuzack, U.S. Pat. No. 5,052,564 describes a compact disc display rack with a number of shelves present thereon. Said shelves each provide a groove into which a lower rearward corner of a compact disc packaging container can rest, when said packaging container rests at an angle with an upper rearward corner of said compact disc packaging container resting against a forward surface of a back element of said compact disc display rack. The Zuzack invention also provides kick-bars or ribs in the back element of said compact disc display rack behind each compact disc packaging container, which serve to facilitate removal of a compact disc packaging container when a lower forward edge thereof is pushed rearward in the disc display rack by a user thereof. When so pushed, said compact disc packaging container is caused to effectively rotate around an associated kick-bar or rib with the upper forward edge thereof being caused to move forward from the rear of said compact disc display rack, where it can be grasped by a user thereof.

A Patent to Fitzpatrick, U.S. Pat. No. 5,048,680 describes a system which is similar to that in Zuzack, but which includes two support rods. Said support rods are similar to the kick-bars or ribs of Zuzack. Pressing on either the upper or lower forward edge of a compact disc packaging container stored in the Fitzpatrick system causes an action similar to that described with respect to the Zuzack system. That is a compact disc packaging container will rotate about one of said rods and make an edge of said compact disc packaging container available to be grasped by a user. The interconnection of a number of said systems is also disclosed.

The use of velcro to secure compact disc packaging containers to display racks or walls etc. is described in a Patent to Whittington, U.S. Pat. No. 5,040,687, and in Patents to Tompkins and Hunt, U.S. Pat. Nos. 4,951,826 and 4,940,147 respectively. The Whittington Patent, in particular, also describes the presence of finger grooves placed to aid a user with opening the front of a compact disc packaging container mounted therein.

A Patent to Factor, U.S. Pat. No. 4,867,306 describes a compact disc rack assembly which has a series of pivotally mounted panels positioned on a stationary support. The panels have a plurality of spaced ledges with outer lips and the ledges are spaced from each other by a length which is less than the overall dimension of the container being housed, so that said container is stored at a slight angle to the panel and is gripped by the lips of the ledge holding the container.

Patents to Massaro and to Hopkins et al, U.S. Pat. Nos. 4,573,749 and 4,350,252 respectively describe systems which secure record jackets or tapes via systems, the use of which requires that an upward insertion motion be followed by a dropping motion. That is a record jacket or tape is entered to such a system by causing an upper end thereof to be pushed upward into the upper extent of such a system, followed by pushing the lower end of said record jacket or tape rearward in said system, and then letting said lower end of said record jacket or tape drop so as to be secured at the a lower forward edge thereof by a system member.

Other Patents describe effectively three-dimensional display devices which allow display of record Jackets and audio cassettes etc. other than in a two dimensional plane. Such Patents include a Patent to Weston, U.S. Pat. No. 3,960,273, a Patent to Serrano, U.S. Pat. No. 4,232,790, a Patent to Hoy, U.S. Pat. No. 3,059 and a Patent to Rumble, U.S. Pat. No. 3,938,665.

The above sampling of Patents demonstrate that inventors have provided inventions aimed at providing means to conveniently store compact discs while simultaneously displaying art work present on major area surfaces of compact disk packaging containers. However, no known Patent teaches a system which is designed to specifically and optimally secure and store Jewel type compact disc packaging containers and the like, while aesthetically displaying art work present on a forward major area surface thereof. The present invention provides such a system.

DISCLOSURE OF THE INVENTION

A popular packaging container for containing and protecting compact disc is typically referred to as a "Jewel" type. Briefly, a Jewel type packaging container presents with a generally rectangular shape, (when viewed from the front, back, either side, top or bottom), is sized to conveniently contain a compact disc within a volume therein, and is designed to allow easy access to said inside volume by rotation of a front element about pivot means present on side elements which perpendicularly and rearwardly, (as viewed in frontal elevation), project from said front element top and bottom edges, said pivot means serving to pivotally connect said front element to a back element at a left side thereof, (again as viewed in frontal elevation). Said front element comprises a front major area surface which is nearly universally provided with art work which can be viewed, in frontal elevation, by a user who is positioned forwardly with respect thereto. The back element of said Jewel type packaging container presents another major area surface, which can be termed the back major area surface, and has side elements which forwardly project perpendicularly from said back major area surface at the top bottom, right and left edges thereof. Said side elements which forwardly project perpendicularly from said back element edges are continuous along the entire length of the right and left sides of a Jewel type packaging container, with right and left defined when viewing a "closed", (ie. the front and back major area surfaces are oriented essentially parallel to one another with the front element being directly forwardly offset with respect to said back element), Jewel type packaging container in frontal elevation, when viewed art work on the front element major area surface is oriented upright. It is also mentioned that when a Jewel type packaging container is viewed in side elevation, or from the top or bottom, when the front and back major area surfaces are projecting vertically from an underlying essentially horizontally oriented surface, relatively narrow rectangular dimension area surfaces are viewed, as compared to the rectangular dimensioned major area surfaces of the front and back elements. Identification markings on said narrow rectangular dimensioned area surfaces can be difficult to see and read. Continuing, the volume within a Jewel type packaging container typically has present a third element, which third element is held in flush contact with a forward surface of said back element major area surface by constructed assembly. Said third element provides a molded shape appropriate for receiving a compact disc in a forward major area surface thereof. Said third element also provides a forwardly projected surface at the left side of the Jewel type packaging container which is essentially structurally equivalent to a centrally extended forward surface of the left side element which forwardly projects perpendicularly from the back element left side edge, for the purposes of use in the present invention display system. That is, for the purposes of the present inventions the left side of the Jewel type packaging container can be considered to present with a relatively wide centrally projected side element surface, which side element forwardly projects perpendicularly from the left edge of the back element. In addition, said forwardly projected surface at the left side of said third element is essentially coplanar with the forward surface of the top element when said top element is positioned with respect to the back element in a closed position, as was described above. It should also be understood that the front element is essentially flat except for rearwardly projected side elements at the top and bottom edges thereof. Said rearwardly projected side elements project perpendicularly with respect to the major area surface of said front element as well as rearward therefrom, with portions thereof projecting to the left past the left side of said front element major area surface. Said pivotal connection means are located on said leftwise projected portions of said rearwardly perpendicularly projected top and bottom side elements. It should also be understood that when the top element is rotated about its pivotal connection means with respect to said back element so as to provide access to a compact disc contained in the volume within said Jewel type packaging container, the portions of the projections from said side elements which rearwardly and perpendicularly project from the front element major surface area edges and that extend to the left of the front element major area surface, and which provide pivotal connection means thereon, rotate so as to project beyond a plane defined by the left side element which forwardly perpendicularly projects from the back element left side edge, and toward which the front element major area surface is pivotally rotated. This is mentioned as a display system which is to be used with Jewel type packaging containers must provide means for accommodation of said projections, as a part of maintaining said Jewel type packaging container therewithin, if said Jewel type packaging container is to be fully openable while mounted in said display system. Finally, it must be mentioned that a slight projection exists from the rearward surface of the back element major area surface at the right side thereof. The construction of a Jewel type packaging container will be better appreciated by reference to the Detailed Description Section, in conjunction with the Drawings.

The present invention, in its most basic embodiment, is comprised of a display system which is generally rectangular in shape, (as viewed from the front, back, top, bottom and sides), which has frame portions forwardly projected at the edges of a back portion major area surface thereof, which back portion major area surface is continuous with but rearwardly perpendicularly recessed with respect to forward surfaces of said frame portions. During use a Jewel type packaging container is caused to be inserted into and is retained within said display system with the outer top, bottom and right and left sides thereof encompassed by inner surfaces of the corresponding top, bottom, and right and left sides of the frame portions of said display system, and so that its major, art work containing, area surface is visible. Simultaneously the rearward surface of the back major surface area of said Jewel type compact disc packaging container which is present in said display system, is positioned essentially flushly against the forward major area surface of the back portion of said display system.

As viewed in frontal elevation when oriented so as to receive a Jewel type packaging container with the art work on the front element major area surface thereof visible and oriented upright, said display system presents with smooth inner frame surfaces along at least a part of the top and bottom frame portions. Cut away areas are typically present along at least a part of the top and bottom frame outer and inner surface portions to provide a user easy access to the upper and lower edges of a jewel type packaging container which has been mounted in said display system. Said cut away areas facilitate removal of a Jewel type packaging container from a display system in which it is mounted. However, along at least a part of the inner surface of the frame portion at the right side of said display system a slight centrally and rearwardly oriented taper is present which merges into a ridge which is essentially parallel to, but centrally offset with respect to the inner surface of said frame portion at the right side of said display system. The rearward surface of said ridge typically stops short of contacting the forward surface of the back portion major area surface, however, thereby providing a groove into which the slight projection which projects from the rearward major area surface of the back element of the Jewel type packaging container, at the right side thereof, can insert during use. At the left side of the display system, projecting centrally from at least a part of the forward surface of the left side frame portion are typically present one or more "lips" under which a forward surface of the side element which forwardly projects perpendicularly from the left side edge of the back element of a Jewel type packaging container, and centrally from the forward aspect thereof, can be placed during use. (Note, that while unimportant to the operation of the present invention, said forward surface of side element which forwardly projects perpendicularly from the left side edge of the back element is actually partially formed by the forward surface of the left side of said third element of said Jewel type packaging container). Said lip(s) being located so that the relatively narrow side dimension of a Jewel type packaging container fits snuggly between the forward surface of the back portion the major area surface of the display system and the rearward surface(s) of said lip(s). Typically, but not necessarily, two lips will be present, projecting from upper and lower locations along the forward surface of said frame portion at the left side of said display system viewed as described. Also typically present along at least a portion of the inner surface of the frame portion at said left side of the display system is a spring projection which can provide resisting "spring" force when pressure, directed to the left, is applied thereto. A Jewel type packaging container can easily be entered to said display system such that the forward surface the side element forwardly projected perpendicularly from the back element left edge is placed under the reward surface(s) of the lip(s) which project centrally from the forward surface of the frame portion along the left side of said display system. The front element of the Jewel type packaging container can then be pushed rearwardly toward the forward surface of the major area surface of the back portion of the display system, with pressure typically being applied to the front major area surface of the front element at the right side of said Jewel type packaging container by a user. The slight centrally and rearwardly oriented taper along at least a part of the inner surface of the right frame portion of the display system serves to, as the front element of the Jewel type packaging container is pushed rearward as just described, cause the spring projection from the inner surface of the frame portion at the left side of the display system to be compressed. This is the case as the Jewel type packaging container is forced to shift slightly to the left within said display system under the influence of said slight centrally and rearwardly oriented taper along at least a part of the inner surface of said frame portion at the right side of said display system. When the Jewel type packaging container is pushed back sufficiently so that the slight projection from the back major area surface of the right side of the back element thereof passes the centrally and rearwardly oriented slight tapered portion along at least a part of the inner surface of the frame portion at the right side of the display system and passes the ridge into which said slight rearward and centrally oriented taper merges, it will become positioned in the groove between the rearward surface of said ridge and the forward surface of the back portion major area surface. Said Jewel type packaging container right and left sides, (which are forwardly projected perpendicularly from the right and left side edges of said back element of the Jewel type packaging container), will then be sandwiched between the ridge which is essentially parallel to the inner surface of the frame portion at the right side of the display system but centrally offset therefrom, and the spring projection which is present along at least a part of the inner surface of the frame portion along the left side of the display system. In combination with the slight projection from the rearward surface of the back element major area surface at the right side thereof being present in the groove between the forward major area surface of the back element and the rearward surface of said ridge on the inner surface of the frame portion at the right side of the display system, it should be appreciated that said Jewel type packaging container will be firmly retained in said display system. It should also be specifically appreciated that the compressed spring projection will provide a force which serves to secure the Jewel type packaging container firmly in place in said display system. In addition, as alluded to above, the lip(s) which project from the forward surface of the frame portion at the left side of the display system simultaneously serve to snuggly retain the left side of said Jewel type packaging container between the rearward surface of said lip(s) and the forward surface of the back major area surface portion of the display system at the left side of said display system. Again, it should be appreciated then that a Jewel type packaging container placed into the display system as described will, because of a number of forces, be securely retained therein.

It is also mentioned that in modified embodiments of the present invention display system the lip(s) which project from the forward surface of the frame portion at the left side thereof, can be eliminated. In addition, one or more spring element can be present projecting centrally from the inner surfaces of the top and bottom frame portions. Also, in some modified embodiments the groove between the rearward surface of the ridge and the forward surface of the back portion of the present invention display system is eliminated.

Continuing, it is again emphasized that it is the back element of the Jewel type packaging container which provides sides which project forwardly and perpendicularly to the back major surface area of the back element edges at the right and left sides thereof and which will be directly retained in said display system. The front element thereof is, thus, free to be rotated about its pivotal connection to said back element. As a possibly necessary inclusion, said display system can also provide grooves which serve to receive the edges of the sides which rearwardly project perpendicularly from the front element and which project beyond the plane defined by the left side of the Jewel type packaging container when said front element is caused to rotate about its connection point with the back element, to fully open said Jewel type compact disc packaging container during use.

It is also mentioned that the back portion major area surface of the present display system can be fabricated to contain a large number of holes. Said holes allow mounting to a wall at optimum locations, and serve to reduce weight.

With the basic embodiment of the present invention display system now disclosed, it should also be appreciated that said display system can have interconnection means present, typically accessible from at least one of the outer surfaces of the left and right side frame portions, for allowing a multiplicity of display systems to be interconnected with one another to form a multiple display system. In some embodiments interconnection means can be present on the outer surfaces of top, bottom, right and left side frame portions.

It is also disclosed that a multiplicity of display systems can be combined into a two dimensional multiple display system and mounted to a wall for instance, or combined with other multiple display systems to form effectively three dimensional multiple display systems. A two dimensional multiple display system can also be attached to a support, such as a pole, to form a system in which said two dimensional display system can be caused to rotate about said support by user applied force. Configurations similar to rotatable racks which have shelves projecting form a support, (such are used to demonstrate greeting cards in retail stores), or displays which configure a number of two dimensional multiple displays attached to rotatable supports, (such as those used to present a multiplicity of posters in a relatively small space in retail stores), can therefore be realized.

As mentioned above, the present invention will be better understood by reference to the Detailed Description Section of the present disclosure, in conjunction with the Drawings.

SUMMARY OF THE INVENTION

Because of sound quality, enthusiasts typically prefer recordings on compact discs. As with records, to avoid damage thereto, compact discs should not be stored stacked one atop another. As a result typical storage systems provide for storage of compact disks with their major surface areas upon which recording is present oriented so as to project vertically. Most enthusiasts store their compact discs so oriented but such that only a relatively small dimension rectangular area side of a container in which said compact disc is present is viewable. It can be difficult to identify a specific compact disc so stored.

As well, it is nearly universal for packaging containers for compact disks to provide art work on a major area surface thereof. Many enthusiasts desire to view said art work while their compact disks are being stored. Inventors have, as a result, provided two and effectively three dimensional storage systems which safely store compact discs and simultaneously aesthetically display said art work.

The present invention teaches an easy to use display system for storing compact disc s, which simultaneously displays art work on a major area surface of a Jewel type packaging container, and the present invention is designed to optimally receive and retain a Jewel type packaging container. The present invention also provides for easy combination of a multiplicity of display systems to form two and three dimensional multiple display systems.

It is therefore a purpose of the present invention to provide a display system which is designed to optimally receive and retain a Jewel type packaging container and the like.

It is another purpose of the present invention to teach a display system which safely stores compact discs while providing for display of art work present on a major area surface of containing Jewel type packaging containers and the like.

It is a further purpose of the present invention to teach a display system which can easily be combined with other such display systems to form two and three dimensional multiple display systems.

DETAILED DESCRIPTION

Figure 1:
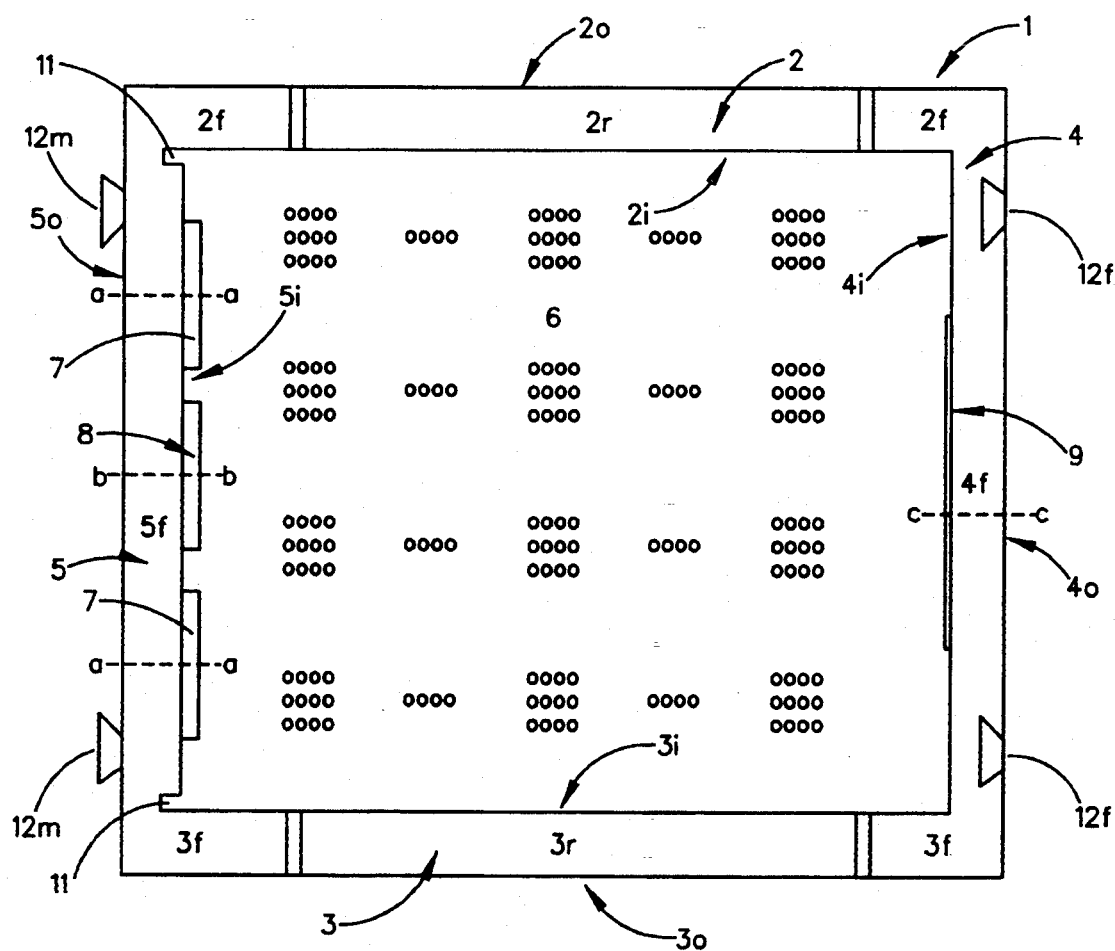
FIG. 1 shows a front elevational view of the present display system invention.

Turning now to the Figures, there is shown in FIG. 1 a front elevational view of the display system (1) of the present invention. Shown are top (2), bottom (3), right side (4) and left side (5) frame portions as well as back portion (6). Said top (2), bottom (3), right side (4) and left side (5) frame portions and said back portion (6) are continuous with said back portion (6) being recessed with respect to forward surfaces (2f), (3f), (4f) and (5f) of said top, bottom, right and left side frame portions respectively. Note that said back portion (6) presents with a major area surface. Also shown are grooves (11) into which connection means (23) containing projections from a front element (21) of a Jewel type packaging container (20), (see FIGS. 6a–6c), can extend when said front element is caused to rotate about a pivotal connection to a back element thereof, to provide access to a contained compact disc contained therein, while said Jewel type compact disc packaging container is present in said display system (1). This will be better understood by reference to the discussion herein with respect to FIGS. 6a–6c.

Figure 2:
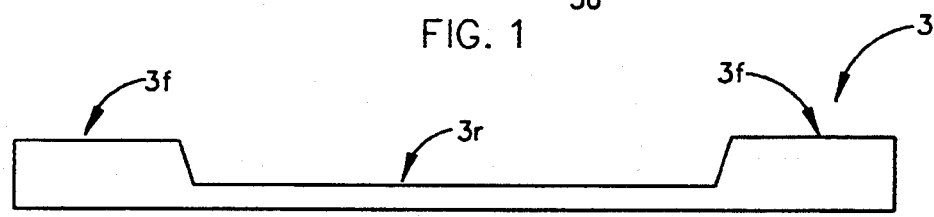
FIG. 2 shows a bottom view of the present display system invention.

FIG. 2 shows bottom view of bottom frame portion (3). A cut away portion is shown which effectively places a forward surface (3r) of the said bottom frame portion at a location closer to a forward surface of said back portion (6) major area surface as compared to forward surfaces of right side (4f) and left side (5f) frame portions and as compared to forward portions (2f) and (3f) of said top and bottom frame portions. (Note, a similar configuration exists at top frame portion (2)). The purpose of said cut away portions is to provide user convenient access to upper and lower edges of a Jewel type packaging container which is retained in said display system (1). It should be understood in viewing FIG. 1 that the subscripts (o), (f) and (i) refer to outer, forward and inner surfaces respectively, of the various top (2) top, bottom (3), right (4) and left (5) side frame portions. (See FIGS. 3-5 for an expanded scale presentation of said outer (o), forward (f) and inner (i) representations with respect to right side (4) and left side (5) frame portions). Also, note that male (12m) and female (12f) interconnection means are shown present and accessible from the outer (o) surface of left side (5) and right side (4) frame portions. When present, utilization thereof allows user formation of multiple display systems comprised of a multiplicity of interconnected display systems. Note that functionally equivalent interconnection means are within the scope of the present invention and the Claims should be interpreted to include any such functional equivalents. As well, although not shown, interconnection means can be present on outer surfaces of top (2o) and bottom (3o) frame portions as well.

Figures 3, 5:
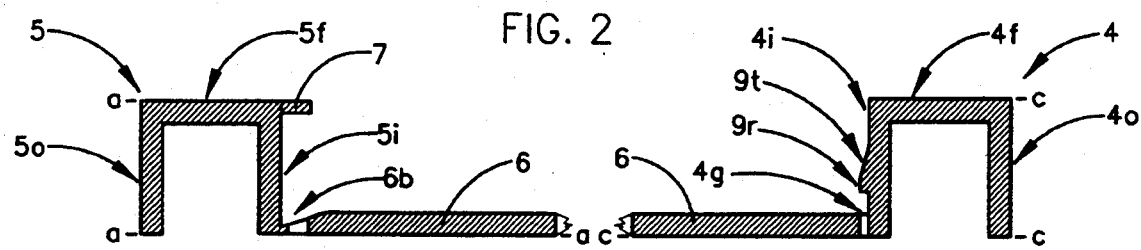
FIG. 3 shows a cross sectional view of the display system of the present invention, taken at a—a in FIG. 1.
FIG. 5 shows a cross sectional view of the display system of the present invention, taken at c—c in FIG. 1.

Continuing, FIG. 3 shows an expanded scale cross sectional view taken at a—a in FIG. 1. Shown are back portion (6), outer (5o), forward (5f) and inner (5i) surfaces of said left side frame element (5). Also shown is a lip (7) which projects centrally from the forward surface (5i) of left side frame portion (5). Note also that back portion (6) is typically beveled at the point (6b) at which it meets the inner surface (5i) of said left side frame portion. This serves to facilitate the entry of a rearwardly positioned left corner of a back element of a Jewel type compact disc packaging container into said display system when the forward surface of a left side element (22) which forwardly projects perpendicularly from said back element left side edge, is slide under the rearward surface of lip (7) by a user when mounting said compact disc packaging container (20), (see FIG. 7a), into said display system (1). As shown in FIG. 1, more than one said lip (7) will typically be present.

Figure 4:
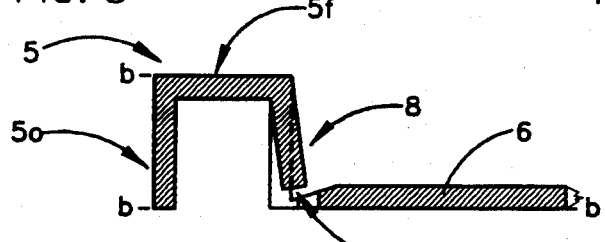
FIG. 4 shows a cross sectional view of the display system of the present invention, taken at b—b in FIG. 1.

Turning now to FIG. 4, there is shown an expanded scale cross sectional view taken at b—b in FIG. 1. Shown are back portion (6), outer (5o), forward (5f), and inner (5i) surfaces of left side frame portion (5), and the beveled (6b) point of back portion (6). Also shown is spring projection (8). The purpose of spring projection (8) will become clear in the following disclosure when the method of placing a Jewel type compact disc packaging container into said display system (1) is presented. However, said spring projection basically serves to provide a force to retain a Jewel type packaging container (20) which is sandwiched between said spring projection (8) at the left and a ridge (9r) (which is described directly herein with respect to FIG. 5), at the right within a display system (1)

Turning now to FIG. 5, there is shown an expanded scale cross sectional view taken at c—c in FIG. 1. Shown are back portion (6), outer (4o), forward (4f), inner (4i) surfaces of said right side frame portion. Also shown is centrally and rearwardly oriented slightly tapered region (9t) along at least a part of the inner surface of right side frame portion (4i), which tapered region (9t) merges into ridge (9r), said ridge (9r) being essentially parallel to the inner surface of said right side frame region (4i), but centrally offset therefrom. Behind said centrally and rearwardly oriented slightly tapered region (9t) and in front of the forward surface of said back portion (6) major area surface is a groove (4g). Said groove (4g) serves to receive a slight projection (26), (see FIGS. 6a-6c), from a rearward surface of a back element of a Jewel type package container (20) during use, (see FIG. 6a and discussion thereof).

It is also mentioned that in a modified embodiment of the present invention display system (1) the lip(s) (7) can be omitted, and the force provided by the spring element (8) relied upon solely to retain a Jewel type packaging container within a display system (1). In addition, although not shown, spring element(s) (8) can be present at the inner surfaces of regions (2i) and/or (3i) of the top (2) and bottom (3) frame portions with the spring element (8) in the left frame portion inner surface (2i) and ridge (9r) present or not. Another modification eliminates spring projection (8) in left frame portion inner surface (2i) and provides spring force capability to ridge (9r). As well, the groove (4g) can be eliminated in some modified embodiments.

Figure 6A:
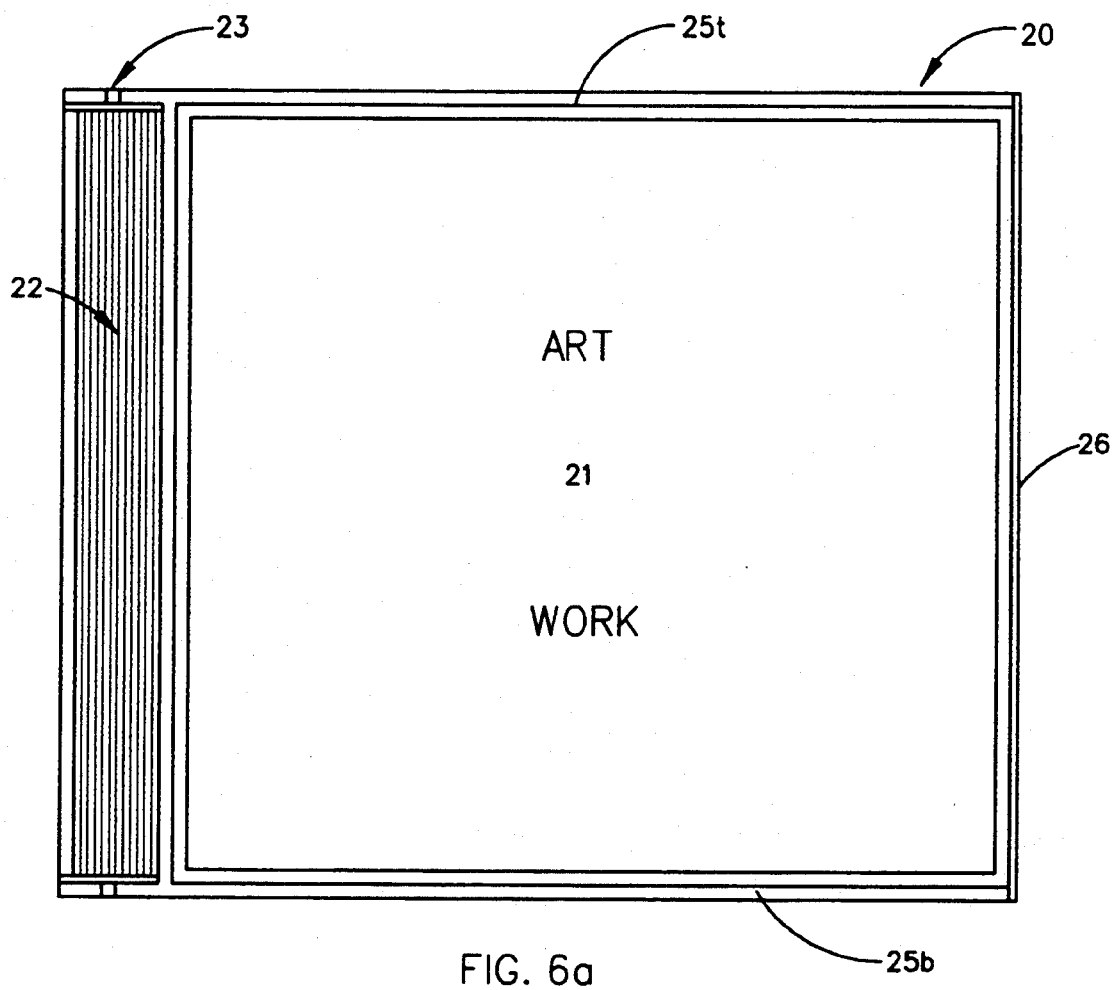
FIG. 6a shows a front elevational view of a Jewel type packaging container.
Figure 6B:
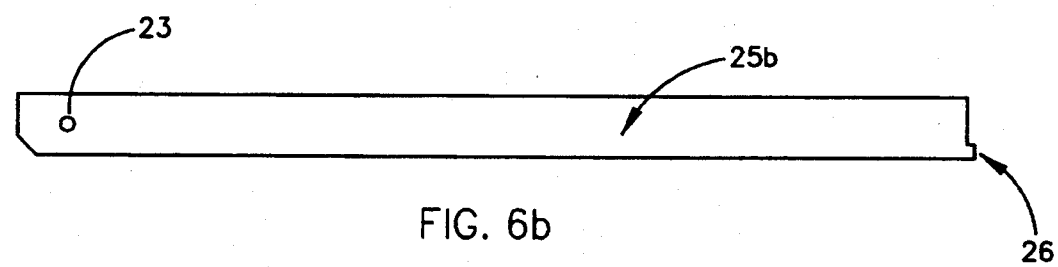
FIG. 6b shows a bottom view of a Jewel type packaging container with an opaque bottom which has its front element rotated so as to close said Jewel type packaging container.
Figure 6C:
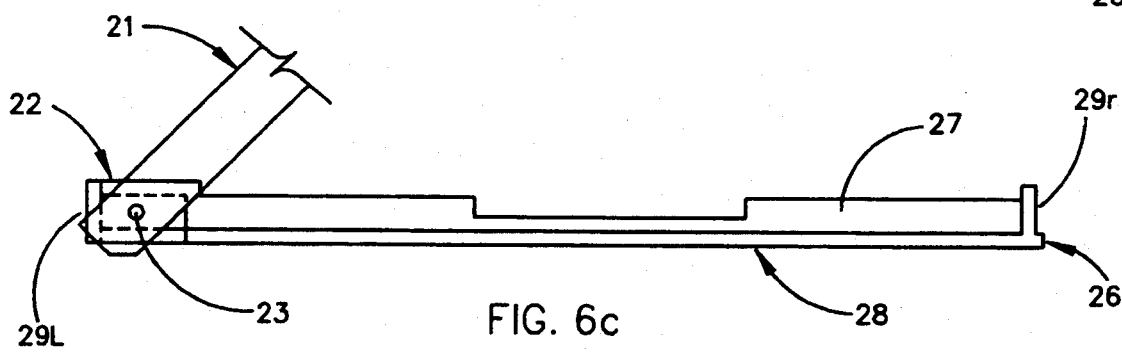
FIG. 6c shows a bottom view of a Jewel type packaging container with a partial view of a clear front element rotated so as to open said Jewel type packaging container.

To proceed it is necessary to understand the important aspects, as regards the present invention, of the construction of a Jewel type packaging container. Turning now to FIGS. 6a, 6b and 6c there is shown in FIG. 6a, a front elevational view of a Jewel type packaging container (20). FIG. 6b is a bottom view showing side element (25b) which rearwardly projects perpendicularly from the bottom edge of said front element (21). FIG. 6c is a bottom view showing a partial front element (21) rotated about pivotal connection means (23) to show back element (28) and third element (27). Jewel type packaging container (20) comprises a front element (21) which presents with a major area surface. Typically art work is present in said front element (21) major area surface. In combination with FIG. 6b also note that front element (21) has not only side element (25b) rearwardly projecting perpendicularly from the bottom edge of said front element (21), but another side element (25t) similarly rearwardly projects perpendicularly from the top edge of said front element (21). Note also that the left side of said Jewel type packaging container provides forward surface (22). With reference to FIG. 6c, it should be noted that said forward surface (22) is partially formed by the forward edge of a side element which forwardly projects perpendicularly from the left edge side of a back element (28), which back element (28) is located directly rearward to said front element (21) as said front element (21) is viewed in FIG. (6a). Said forward surface area (22) is also partially formed from a forward surface of a third element (27) which is present inside Jewel type packaging containers. Although not important with respect to the present invention, the major area forward surface of said third element (27) is molded to receive and contain a compact disc. Also note that a slight projection (26) is shown at the right side of said Jewel type packaging container (20). Said slight projection (26) projects from the rearward surface of said back element (6). In use, said slight projection (26) enters the groove (4g) shown in FIG. 5 when a Jewel type packaging container providing said slight projection (26) is placed into a present invention display system (1). It must also be understood that front element (21) has no side element rearwardly projecting perpendicularly from the right side edge thereof. That is, the side element (29r) shown forwardly projecting perpendicularly from the right side edge of back element (28) is accessible regardless of the rotated position of front element (21). A similar observation is valid with respect to side element (29l) which forwardly projects perpendicularly from the left edge of back element (28). That is, the right and left side elements (29r) and (29l) are directly accessible from outside the Jewel type packaging container regardless of the rotated position of front element (21) about pivotal connection means (23). Note also, in FIG. 6c, that a partial view of front element (21), made from a clear material, is shown rotated about pivotal connection means (23) to place said Jewel type packaging container in an "open" position. Note that rotating said front element (21) about said pivotal connection means (23) causes the left forward edge of the side element (25b), (and a corresponding left forward edge of a side element (25t), (not shown), to project beyond a plane defined by the left edge of back element (28). Grooves (11) shown in FIG. 1 serve to accommodate this in use.

In use then, a Jewel type packaging container (20) is entered into the display system (1) of the present invention by placing forward surface (22), (see FIG. 6a) at the left side thereof under the rearward surface(s) of lip(s) (7), (see FIG. 1). Note that bevel point (6b), (see FIG. 4), in forward surface of back portion (6) of the display system serves to accept the rearward left edge of the element (28) when this is done. Next, the front element (20) is pressed rearward. The rearward and centrally oriented slight taper (9t) present on the inner surface (4i) of right frame portion (4) causes said action to force said Jewel type packaging container (20) to move not only rearward, but also to the left. This action compresses spring element (8). When the rearward right edge of said Jewel type packaging container is pushed far enough rearward said slight projection (26), (see FIGS. 6a, 6b, and 6c), which projects from the rearward surface of said back element of the jewel type packaging container (20) will enter groove (4g). (see FIG. 5). At this point said spring projection (8) will relax a bit, but will still provide sufficient spring force to sandwich said Jewel type packaging container (20) between said spring projection (8) at the left side (29l) and said ridge (9r) at the right side (29r). As the front element (21) is not directly contacted by spring element (8) or ridge (9r), and is not restricted by the rearward surfaces of lip(s) (7), it remains free to rotate about pivotal connection means (23). As a result, the Jewel type packaging container (20) can be opened and closed while in place in the present invention display system (1).

To remove a Jewel type packaging container (20) from the present invention display system (1) a user grasps the upper and lower edges thereof through the cut away areas in top (2) and bottom (3) frame portions, then pushes said Jewel type packaging container (20) to the left and pulls forward. Said Jewel type packaging container (20) is easily released by said action.

Figure 7A:
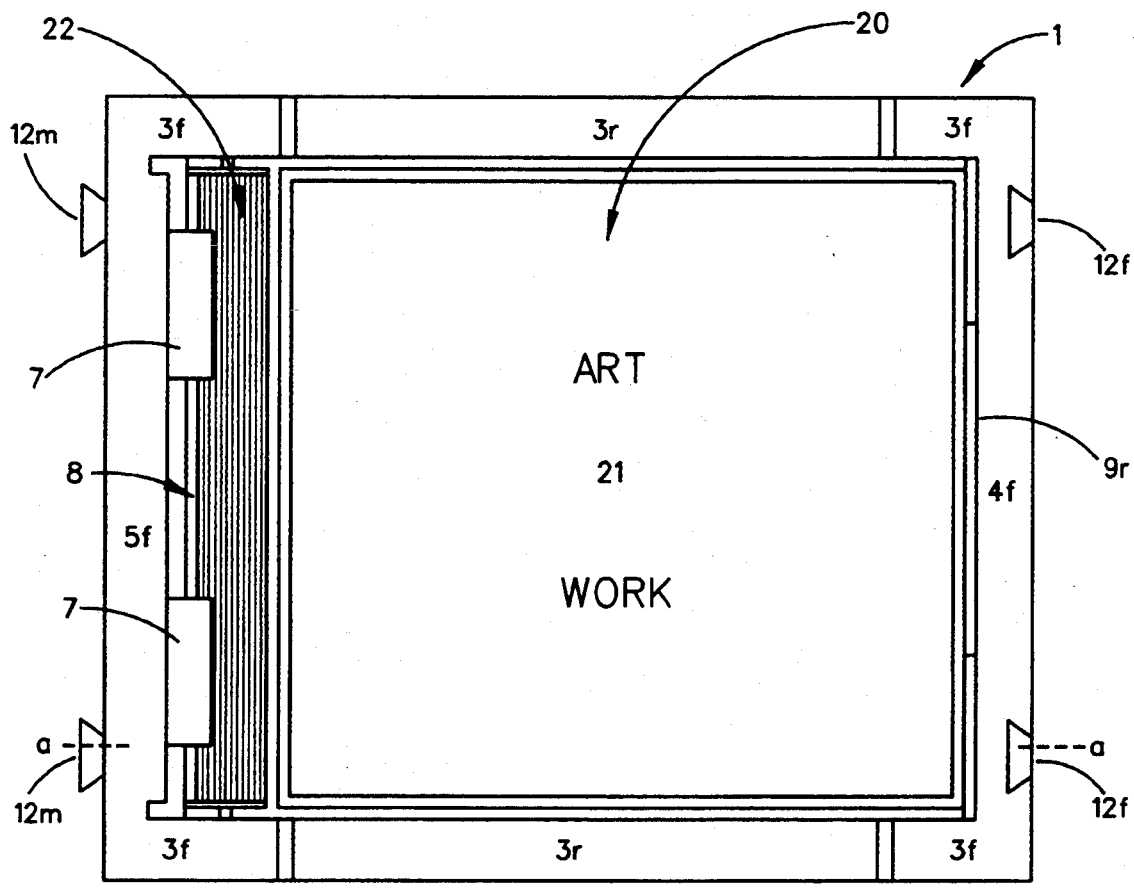
FIG. 7a shows a front elevational view of the present invention with a Jewel type packaging container mounted therein.
Figure 7B:
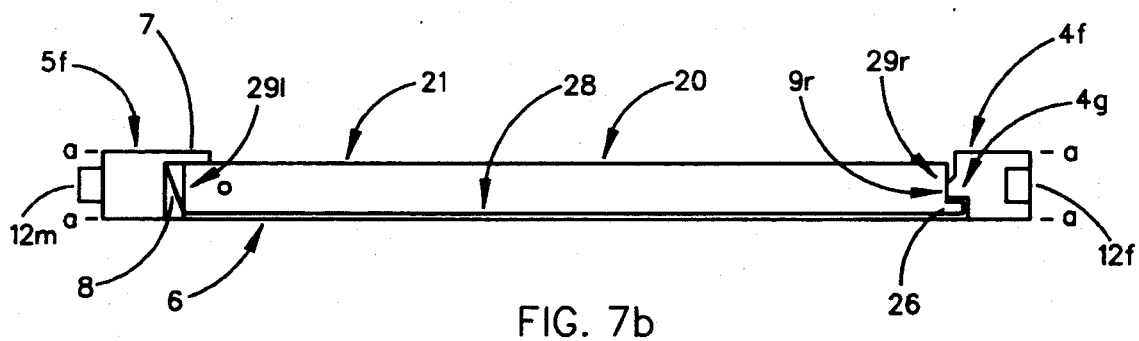
FIG. 7b shows a cross sectional view of a display system of the present invention taken at a—a in FIG. 7a, with a Jewel type packaging container therein.

FIG. 7a shows a front elevational view of a Jewel type packaging container (20) in place in the present invention display system (1). FIG. 7b shows a cross-sectional view taken at a—a in FIG. 7a, with spring projection (8) also shown. Note that said Jewel type packaging container back element sides (29r) and (29l) are sandwiched between said spring projection (8) at the left and ridge (9r) at the right. Note also that forward surface (22) is behind the rearward surface of lip (7), that the rearward surface of back element (28) major area surface of the Jewel type packaging container (20) is flushly against the forward surface of display system (1) back portion (6) major area surface and that the slight projection (26) from the rearward surface of Jewel type packaging container (20) back element (28) at the right side thereof is present in groove (4g), which groove (4g) is present rearward of ridge (9r) and forward from the forward surface of Jewel type packaging container back portion (6), at the right side thereof.

Figure 8:
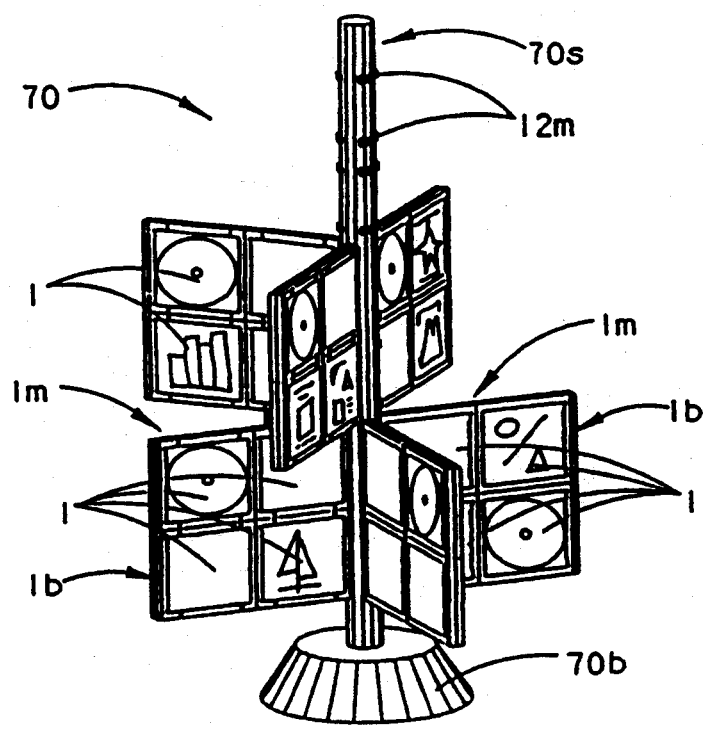
FIG. 8 shows a partially constructed effectively three dimensional multiple display formed by interconnecting a multiplicity of display systems, said multiplicity of display systems being connected to a rotatable support.

Turning now to FIG. 8, there is shown a support (70s) positioned so as to project vertically from base (70b). Present on support (70s) are shown for demonstration purposes a multiplicity of male (12m) interconnection means. (Note that female interconnections means or any functionally equivalent interconnection means can be substituted). A number of multiple display systems (1m) can be constructed and interconnected to said support (70s) via complimentary interconnection means present on outer surfaces of said display system right and left side frame portion. Three such multiple display systems (1m) are shown in place at the lowest level on said support (70s), one projecting to the left and one to the right, for demonstration purposes. Note that a multiple display system (1m) is typically two sided, thereby allowing simultaneous back to back display of art work on compact disc packaging container major area surfaces. Additional vertically oriented levels can be present in support (70s). As well, base (70b) can be of a construction type which allows rotation of said support (70s), making it possible for a user to stand in one position and cause said support (70s) to rotate to enable viewing of all displayed compact disc packaging container art work, in the effectively three dimensional multiple display system. Such a multiple display is similar to displays used to present greeting cards, for instance, in retail stores. It should also be noted that finishing elements (1b) can be provided and utilized to make the edges of a display system appear finished, by encasing interconnection means (12m). As well, display systems for use in the outermost sections of a multiple display system can be fabricated without interconnections means (12m) or (12f) present.

Figure 9:
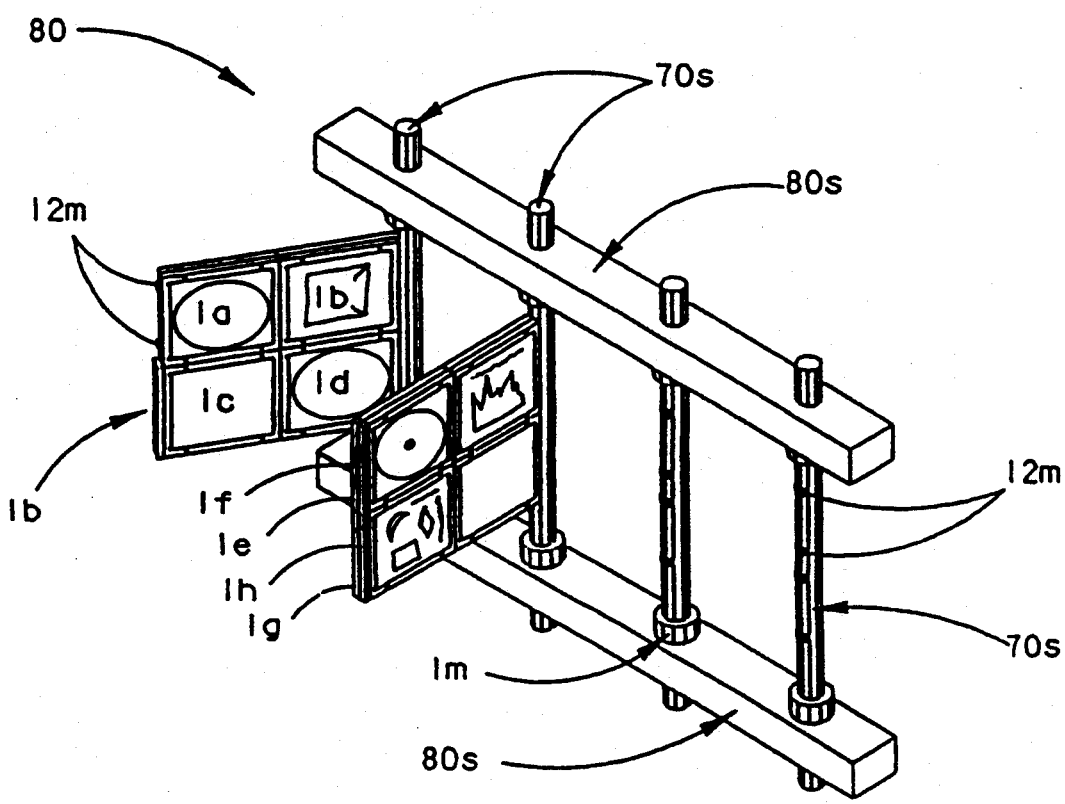
FIG. 9 shows another partially constructed effectively three dimensional multiple display system, said multiplicity of display systems being connected to a multiplicity of supports, with each of said multiplicity of supports being rotatably mounted at their ends to other supports.

FIG. 9 shows another approach to forming an effective three dimensional multiple display system. Supports (80s) are shown. Note that said supports (80s) have provisions for securing the upper and lower ends of supports (70s) therein in a stable vertically oriented configuration. Shown in perspective is single sided multiple display system comprised of display systems (1a), (1b), (1c) and (1d). Shown in end view is a two sided multiple display system (1e), (1f), (1g) and (1h). Note that display systems (1e) and (1f) form a back to back multiple display system, as do display systems (1g) and (1h). Also shown is a support (70s) present between supports (80s) ready to have display systems connected thereto. Any number of display systems can be present between supports (80s). Such a multiple display system is similar to displays used to present posters in retail stores.

Of course two dimensional multiple display systems can also be formed from a multiplicity of interconnected display systems and hung on a wall, for instance. When this is done, said multiple display system will, of course, typically be of a one-sided construction.

The present invention display system was described as viewed in frontal elevation, oriented so as to contain a Jewel type compact disc packaging container with its art work being viewable, and oriented upright, from a position forward thereof. Terms such as "top", "bottom", "right", "left", "forward" and "rearward" were used to aid with description of said display system as so viewed. Said terms are not to be interpreted to be limiting to the orientation in which a display system can be placed during use. For instance, it would be within the scope of the present invention to place the display system (1) such that its "left" side frame portion (5) is, during use, at the right as viewed from a position forward thereof, and in which the "top" frame portion (2) is oriented at the bottom as so viewed. It is also to be understood that ridge (9r) can simply be the end of taper (9t) with groove (4g) present or not directly therebeneath; that a hole in the back portion (6) of display system (1) can be of a relatively large diameter and essentially serve to provide access to the rear of a compact disc packaging container (20) placed in a display system (1); that more than one display system (1) can be fabricated in a single combination system without need for interconnection means (12m) and (12f) to effect interconnection at either side or the top or bottom thereof; and that a lip (7) can be affixed to a forward aspect of a spring element (8) rather than to the forward surface of a frame portion. In the later case said spring element (8) might then affix to the forward surface of back portion (6) rather than to the forward surface of a frame portion as is shown in FIG. 4. The Claims are to be interpreted to include embodiments as described in this paragraph.

Having hereby disclosed the subject matter of the present invention, it should be obvious that many modifications, substitutions, and variations of the present invention are possible in light of the teachings. It is to be understood that the invention can be practiced other than as specifically described, and should be limited in breadth and scope only by the Claims.

I claim:

1. A display system for displaying a compact disc packaging container which is, as viewed in frontal elevation, generally rectangular in shape with top, bottom, left and right side frame portions at the edges of a major area surface thereof, said top, bottom, right and left side frame portions each comprising forward, inner and outer surfaces, and said display system further comprising a back portion which is continuous with said top, bottom, right and left side frame portions but recessed with respect to the forward surfaces of said top, bottom, right and left side frame portions; said top and bottom frame portions being optionally partially cut away so that the forward surfaces thereof in said cut away areas are nearer to a forward surface of the back portion than are the forward surfaces of the remainder of said top and bottom frame portions and of the left and right side frame portions; the inner surface of said right frame portion being formed so as to provide a rearward and centrally oriented slight taper along at least a part thereof, which rearward and centrally oriented slight taper merges into a ridge which is essentially parallel to but centrally offset from the inner surface of said right frame portion; the inner surface of which left frame portion presents with a spring projection which projects centrally from and along at least a part thereof; such that a compact disc packaging container can be placed within the inner surfaces of said display system top, bottom, right and left side frame portions with an art work containing major area surface thereof being visible from the front of said display system; said right and left sides of said compact disc packaging container being held in place between said ridge in said inner surface of said right frame portion and said spring projection from said inner surface of said left frame portion respectively; such that a front element of said compact disc packaging container can be rotated about a pivotal connection with said compact disc packaging container back element to provide access to a compact disc contained within said compact disc packaging container without removing said compact disc packaging container from said display system.

2. A display system for displaying compact disc packaging containers as in claim 1, which further comprises at least one lip which centrally projects from the forward surface of said left frame portion such that the left side of said compact disc packaging container contained therein is simultaneously sandwiched between the rearward surface of said one or more lips and the forward surface of said back portion.

3. A display system for displaying compact disc packaging containers as in claim 1, which further comprises at least one lip which centrally projects from the forward aspect of said spring element such that a compact disc packaging container contained therein is simultaneously sandwiched between the rearward surface of said one or more lips and the forward surface of said back portion.

4. A display system for displaying compact disc packaging containers as in claim 1, which further comprises at least one spring element projecting centrally from the inner surface of said top and/or bottom frame.

5. A display system for displaying a compact disc packaging containers which is, as viewed in frontal elevation, generally rectangular in shape with top, bottom, left and right side frame portions at the edges of a major area surface thereof, said top, bottom, right and left side frame portions each comprising forward, inner and outer surfaces, and said display system further comprising a back portion which is continuous with said top, bottom, right and left side frame portions but recessed with respect to the forward surfaces of said top, bottom, right and left side frame portions; said top and bottom frame portions being optionally partially cut away so that the forward surfaces thereof in said cut away areas are nearer to a forward surface of the back portion than are the forward surfaces of the remainder of said top and bottom frame portions and of the left and right side frame portions; the inner surface of said right frame portion being formed so as to provide a rearward and centrally oriented slight taper along at least a part thereof, which rearward and centrally oriented slight taper merges into a ridge which is essentially parallel to but centrally offset from the inner surface of said right frame portion; the inner surface of which left frame portion presents with a spring projection which projects centrally from and along at least a part thereof, and from the forward surface of said left frame portion centrally projects at least one lip; such that a compact disc packaging container can be placed within the inner surfaces of said display system top, bottom, right and left side frame portions with an art work containing major area surface thereof being visible from the front of said display system, said right and left sides of said compact disc packaging container being held in place between said ridge in said inner surface of said right frame portion and said spring projection from said inner surface of said left frame portion respectively, with the left side of said compact disc packaging container simultaneously being sandwiched between the rearward surface of said lip and the forward surface of said back portion, such that a front element of said compact disc packaging container can be rotated about a pivotal connection with said compact disc packaging container back element to provide access to a compact disc contained within said compact disc packaging container without removing said compact disc packaging container from said display system.

6. A display system as in claim 1, which further comprises interconnection means in the outer surfaces of at least one of said right, left, top and bottom frame portions for use in interconnecting multiple display systems.

7. A display system as in claim 1, in which the back portion has a multiplicity of holes therein for use in mounting said display system to a wall and the like, said presence of holes serving also to reduce the weight of said display system.

8. A multiple display system for displaying a multiplicity of compact disc packaging containers which is comprised of a multiplicity of display systems which are, as viewed in frontal elevation, each generally rectangular in shape with top, bottom, left and right side frame portions at the edges of a major area surface thereof, said top, bottom right and left side frame portions each comprising forward, inner and outer surfaces, and said display system further comprising a back portion which is continuous with said top, bottom, right and left side frame portions but recessed with respect to the forward surfaces of said top, bottom, right and left side frame said top and bottom frame portions being optionally partially cut away so that the forward surfaces thereof in said cut away areas are nearer to a forward surface of the back portion that are the forward surfaces of the remainder of said top and bottom frame portions and of the left and right side frame portions; the inner surface of said right frame portion being formed so as to provide a rearward and centrally oriented slight taper along at least a part thereof, which rearward and centrally oriented slight taper merges into a ridge which is essentially parallel to but centrally offset from the inner surface of said right frame portion; the inner surface of which left frame portion presents with a spring projection that projects centrally from end along at least a part thereof, and from the forward surface of said left frame portion centrally projects at least one lip; such that a compact disc packaging container can be placed within the inner surfaces of said display system top, bottom, right and left side frame portions with an art work containing major area surface thereof being visible from the front of said display system, said right and left sides of said compact disc packaging container being held in place between said ridge in said inner surface of said right frame portion and said spring projection from said inner surface of said left frame portion respectively, and with the left side of said compact disc packaging container simultaneously being sandwiched between the rearward surface of said lip and the forward surface of said back portion, such that a front element of said compact disc packaging container can be rotated about a pivotal connection with said compact disc packaging container back element to provide access to a compact disc contained within said compact disc packaging container without removing said compact disc packaging container from said display system.

9. A multiple display system as in claim 8, which is comprised of a multiplicity of display systems interconnected by interconnection means to form a two dimensional configuration.

10. A multiple display system as in claim 8, which is comprised of a multiplicity of display systems interconnected by interconnection means to form an effective three dimensional configuration.

11. An effectively three dimensional multiple display system for simultaneously displaying art work on a multiplicity of compact disc packaging containers which is comprised of a multiplicity of interconnected display systems which are each, as viewed in frontal elevation, generally rectangular in shape with top, bottom, left and right side frame portions at the edges of a major area surface thereof, said top, bottom right and left side frame portions each comprising forward, inner and outer surfaces, and said display system further comprising a back portion which is continuous with said top, bottom, right and left side frame portions but recessed with respect to the forward surfaces of said top, bottom, right and left side frame portions; said top and bottom frame portions being optionally partially cut away so that the forward surfaces thereof in said cut away areas is nearer to a forward surface of the back portion than are the forward surfaces of the remainder of said top and bottom frame portions and of the left and right side frame portions; the inner surface of said right frame portion being formed so as to provide a rearward and centrally oriented slight taper along at least a part thereof, which rearward and centrally oriented slight taper merges into a ridge which is essentially parallel to but centrally offset from the inner surface of said right frame portion; the inner surface of which left frame portion presents with a spring projection that projects centrally from and along at least a part thereof, and from the forward surface of said left frame portion centrally projects at least one lip; such that a compact disc packaging container can be placed within the inner surfaces of said display system top, bottom, right and left side frame portions with an art work containing major area surface thereof being visible from the front of said display system, said right and left sides of said compact disc packaging container being held in place between said ridge in said inner surface of said right frame portion and said spring projection from said inner surface of said left frame portion respectively, with the left side of said compact disc packaging container simultaneously being sandwiched between the rearward surface of said lip and the forward surface of said back portion, such that a front element of said compact disc packaging container can be rotated about a pivotal connection with said compact disc packaging container back element to provide access to a compact disc contained within said compact disc packaging container without removing said compact disc packaging container from said display system; which display system further comprises interconnection means in the outer surfaces of at least one of said right and left side frame portions, and in which at least one of said display systems is interconnected to a support such as a pole, to form said effective three dimensional multiple configuration in which said interconnected multiplicity of display systems can optionally be caused to rotate about said support by user applied force.

12. A display system as in claim 1, which further comprises a groove between the rearward surface of said ridge, which ridge is essentially parallel to the inner surface of the right side frame element but centrally offset therefrom, and the forward surface of said back portion.

13. A display system as in claim 5, which further comprises a groove between the rearward surface of the ridge, which ridge is essentially parallel to the inner surface of the right side frame portion but centrally offset therefrom, and the forward surface of said back portion.

14. A effectively three dimensional multiple display system as in claim 11, which further comprises a groove between the rearward surface of the ridge in each display system, which ridge is essentially parallel to the inner surface of the right side frame portion in its specific display system but centrally offset therefrom, and the forward surface of said back portion.

15. A display system as in claim 5, which further comprises grooves in the forward surface of the left frame portion for receiving pivotal connection means containing projections from the top element of a compact disc packaging container when said compact disc packaging container front element is caused to rotate so as to open said compact disc packaging container.

16. A multiple display system as in claim 8, which further comprises grooves in the forward surface of the left frame portion for receiving pivotal connection means containing projections from the top element of a compact disc packaging container when said compact disc packaging container front element is caused to rotate so as to open said compact disc packaging container.

17. A multiple display system as in claim 11, which further comprises grooves in the forward surface of the left frame portion for receiving pivotal connection means containing projections from the top element of a compact disc packaging container when said compact disc packaging container front element is caused to rotate so as to open said compact disc packaging container.

18. A method of entering a compact disc packaging container into a display system comprising the steps of:
 a. obtaining a display system for displaying a compact disc packaging container which is, as viewed in frontal elevation, generally rectangular in shape with top, bottom, left and right side frame portions at the edges of a major area surface thereof, said top, bottom, right and left side frame portions each comprising forward, inner and outer surfaces, and said display system further comprising a back portion which is continuous with said top, bottom, right and left side frame portions but recessed with respect to the forward surfaces of said top, bottom, right and left side frame portions; said top and bottom frame portions being optionally partially cut away so that the forward surfaces thereof in said cut away areas are nearer to a forward surface of the back portion than are the forward surfaces of the remainder of said top and bottom frame portions and of the left and right side frame portions; the inner surface of said right frame portion being formed so as to provide a rearward and centrally oriented slight taper along at least a part thereof, which rearward and centrally oriented slight taper merges into a ridge which is essentially parallel to but centrally offset from the inner surface of said right frame portion; the inner surface of which left frame portion presents with a spring projection which projects centrally from and along at least a part thereof, and from the forward surface of said left frame portion centrally projects at least one lip; such that a compact disc packaging container can be placed within the inner surfaces of said display system top, bottom, right and left side frame portions with an art work containing major area surface thereof being visible from the front of said display system, said right and left sides of said compact disc packaging container being held in place between said ridge in said inner surface of said right frame portion and said spring projection from said inner surface of said left frame portion respectively, with the left side of said compact disc packaging container simultaneously being sandwiched between the rearward surface of said lip and the forward surface of said back portion, such that a front element of said compact disc packaging container can be rotated about a pivotal connection with said compact disc packaging container back element to provide access to a compact disc contained within said compact disc packaging container without removing said compact disc packaging container from said display system;
 b. sliding the forward surface of the left side of said compact disc packaging container under the rearward surface of said lip; and
 c. applying rearward pressure to the forward surface of the front element of said compact disc packaging container until said compact disc packaging container is entered to said display system sufficiently so that it is sandwiched between said spring projection at the left side thereof and said ridge which is essentially parallel to, but centrally offset from, the inner surface of said right side frame portion the right side thereof.

19. A display system for displaying a compact disc packaging container which is, as viewed in frontal elevation, generally rectangular in shape with top, bottom, left and right side frame portions at the edges of a major area surface thereof, said top, bottom, right and left side frame portions each comprising forward, inner and outer surfaces, and said display system further comprising a back portion which is continuous with said top, bottom, right and left side frame portions but recessed with respect to the forward surfaces of said top, bottom, right and left side frame portions; said top and bottom frame portions being optionally partially cut away so that the forward surfaces thereof in said cut away areas are nearer to a forward surface of the back portion than are the forward surfaces of the remainder of said top and bottom frame portions and of the left and right side frame portions; the inner surface of said right frame portion being formed so as to provide a rearward and centrally oriented spring force providing slight taper along at least a part thereof, which rearward and centrally oriented slight taper merges into a ridge which is essentially parallel to but centrally offset from the inner surface of said right frame portion; such that a compact disc packaging container can be placed within the inner surfaces of said display system top, bottom, right and left side frame portions with an art work containing major area surface thereof being visible from the front of said display system; said right and left sides of said compact disc packaging container being held in place between said ridge in said inner surface of said right frame portion and said inner surface of said left frame portion respectively; such that a front element of said compact disc packaging container can be rotated about a pivotal connection with said compact disc packaging container back element to provide access to a compact disc contained within said compact disc packaging container without removing said compact disc packaging container from said display system.

* * * * *